(12) United States Patent
De Araújo Ponte et al.

(10) Patent No.: US 9,656,924 B2
(45) Date of Patent: May 23, 2017

(54) PROCESS FOR PRODUCING A ZINC SULFATE SOLUTION, OBTAINED FROM STEELWORKS POWDER AND RESPECTIVE FERTILIZER INPUTS

(71) Applicants: Haroldo De Araújo Ponte, Curitiba (BR); Ana Carolina Tedeschi Gomes Abrantes, Curitiba (BR)

(72) Inventors: Haroldo De Araújo Ponte, Curitiba (BR); Ana Carolina Tedeschi Gomes Abrantes, Curitiba (BR)

( * ) Notice: Subject to any disclaimer, the term of this patent is extended or adjusted under 35 U.S.C. 154(b) by 0 days.

(21) Appl. No.: 14/888,068

(22) PCT Filed: Apr. 30, 2014

(86) PCT No.: PCT/BR2014/000138
§ 371 (c)(1),
(2) Date: Oct. 29, 2015

(87) PCT Pub. No.: WO2014/176655
PCT Pub. Date: Nov. 6, 2014

(65) Prior Publication Data
US 2016/0075610 A1 Mar. 17, 2016

(30) Foreign Application Priority Data
Apr. 30, 2013 (BR) .......................... 1020130106640

(51) Int. Cl.
*C01G 9/06* (2006.01)
*C05D 9/02* (2006.01)
(Continued)

(52) U.S. Cl.
CPC ................ *C05D 9/02* (2013.01); *C01G 9/06* (2013.01); *C05G 3/0064* (2013.01); *C21B 3/04* (2013.01);
(Continued)

(58) Field of Classification Search
CPC .... C01G 9/06; C21B 3/04; C22B 7/02; C22B 7/007; Y02P 10/234; Y02W 30/542; C05D 9/02; C05G 3/0064
See application file for complete search history.

(56) References Cited

U.S. PATENT DOCUMENTS 2,222,468 A * 11/1940 Saunders ................. C01G 9/06
422/225
4,124,462 A * 11/1978 Reinhardt .............. C01G 3/003
205/581
(Continued)

FOREIGN PATENT DOCUMENTS

GB              1218762 A *  1/1971  ............... C01G 9/04

OTHER PUBLICATIONS

International Search Report, PCT/BR2014/000138.
(Continued)

*Primary Examiner* — Timothy Vanoy
(74) *Attorney, Agent, or Firm* — Brian J. Pangrle

(57) ABSTRACT

The present application refers to zinc recovery process from steelworks powder, and to obtain a zinc sulfate solution with 12% Zn by weight with the expected degree for fertilizer. Such an approach can aim to add value to a steelmaking waste, by partially converting environmental liability in commercial product taking advantage of the steelworks' powder as a raw material for the production of a liquid fertilizer and ready for use, containing zinc and sulfur with low liquid effluent production. Such an approach can be advantageous as to simplicity, use of mild temperatures, use of a single reactant, overall conversion of the reactants into a product solution of commercial quality, ready for use as a foliar fertilizer with low generation of wastewater and without generation of additional waste.

5 Claims, 1 Drawing Sheet

(51) Int. Cl.
  *C21B 3/04* (2006.01)
  *C22B 7/02* (2006.01)
  *C22B 7/00* (2006.01)
  *C05G 3/00* (2006.01)

(52) U.S. Cl.
  CPC .............. *C22B 7/007* (2013.01); *C22B 7/02* (2013.01); *Y02P 10/234* (2015.11); *Y02W 30/542* (2015.05)

(56) References Cited

U.S. PATENT DOCUMENTS

| | | | | |
|---|---|---|---|---|
| 4,355,009 | A | * 10/1982 | Stewart | C01G 9/06 423/101 |
| 4,610,721 | A | 9/1986 | Duyvesteyn et al. | |
| 4,610,722 | A | 9/1986 | Duyvesteyn et al. | |
| 4,614,543 | A | * 9/1986 | Duyvesteyn | C22B 3/06 423/109 |
| 4,698,139 | A | * 10/1987 | Fugleberg | C01G 1/10 205/560 |
| 4,778,520 | A | * 10/1988 | Spink | C22B 19/02 205/608 |

OTHER PUBLICATIONS

Havlik et al. Hydrometallurgical processing of carbon steel EAF dust. Journal of Hazardous Materials B315 (2006) 311-318.

Menon RG and Rahman KZ. The Basics of Zinc in Crop Production. Technical Bulletin T-43, International Fertilizer Development Center, USA, Jul. 1996.

Jha MK, Kumar V, Singh RJ. Review of hydrometallurgical recovery of zinc from industrial wastes. Resources Conservation & Recycling 33 (2001) 1—22.

\* cited by examiner

PROCESS FOR PRODUCING A ZINC SULFATE SOLUTION, OBTAINED FROM STEELWORKS POWDER AND RESPECTIVE FERTILIZER INPUTS

RELATED APPLICATIONS

This application is a 35 U.S.C. §371 National Stage of PCT/BR2014/000138, filed 30 Apr. 2014 (published as WO/2014/176655 on 6 Nov. 2014), which claims priority to BR 10 2013 010664 0, filed 30 Apr. 2013, which is an application for a patent of invention (PI) in Brazil. All of the foregoing applications and publications thereof are incorporated by reference herein.

BACKGROUND

Currently what is known regarding recovery processes in steelworks powder, comes down basically in the hydrometallurgical process, which has been considered environmentally friendly, producing residues having safe disposal, since zinc can be dissolved leaving other impurities in the residue. Sulfuric acid and ammoniacal solutions are considered to be effective reagents for waste treatments for zinc recovery. Ammoniacal solutions should not be present when the final product of interest is zinc sulfate solution. Sodium hydroxide is selective for zinc; however the metal recovery process needs to be enhanced through the electrolysis process, which leads to an overhead of energy for zinc recovery. Furthermore, it would be necessary later to attack with sulfuric acid to obtain the zinc sulfate solution, increasing the cost for reagents. The use of hydrochloric acid is not commercially viable since their attack is not selective and cost of materials is high. Organic acids are not cost-effective and do not have selectivity to iron, extracting it together.

Articles published in the journal J Hazard Mater. 2010 Jul. 15; 179 (I-3): I-7 and J Hazard Mater. 2010 Jul. 15; 179 (I-3): 8-14 reported the development of an integrated process for the recovery of zinc from electric arc furnace dust. It shows the process of leaching with dilute sulfuric acid, and purification of leach liquor and the recovery of zinc by solvent extraction and electro deposition. The leaching process was based on zinc extraction with dilute sulfuric acid under atmospheric conditions and without using any pretreatment. The disadvantage is the use of electrolysis, which demands great energy expenditure.

The Brazilian patent PI0801716-6A shows the chemical process for treating industrial waste steel, named generically as "steelworks powder", to enable the subsequent recovery of zinc, iron and other metals of interest herein. The main objectives of the process are: (i) the opening of crystal structures called zinc ferrites, originally formed in steelworks' powder, with the simultaneous production of soluble sulfates in aqueous media, and (ii) the destruction of possible organic chains containing chlorine (dioxins) without its subsequent regeneration. Generally, the process can be summarized as the production of sulfates, or salts of the constituent metals from the steelworks powder using concentrated sulfuric acid and reaction reagents or dry process catalysts at normal pressure and moderate temperatures. It is to promote the direct reaction of concentrated sulfuric acid with the constituent elements of steelworks' powder maintaining a homogeneous mixture without the presence of water, and preventing agglomeration of particles through addition of reagents and or secondary catalysts; in the specific case, milled solid potassium chloride. The disadvantages consist in the use of temperatures above 100° C., which facilitates joint dissolution of iron and increases energy expenditure of the process.

U.S. Pat. No. 4,610,721 is directed to a process provided for the selective recovery of zinc from steel powder containing substantial amounts of iron. The process includes atmospheric leaching of steel powder, in a first phase in which a quantity is mixed with an acidic zinc sulfate solution to leach zinc, the leaching of powder is such that the pH of the solution is controlled at 2 to 3.5 and preferably about 2.5 to 3.5, thereby limiting the dissolution of iron. The mixture is then subjected to a separation step in unprocessed/solid liquid, in which a thick pulp is obtained containing zinc and iron, and a distinct liquid containing reduced iron and substantial amounts of zinc, this is the solution being delivered to the zinc recovery. After separation, the thick pulp, together with additional or spent sulfuric acid electrolyte, it is subjected to the high pressure leaching at a temperature at least sufficient to leach remaining amounts of zinc and provide an acid zinc sulfate solution of itself, during the conversion of hydrated iron oxides into sedimented hematite residue. An additional amount of sulfuric acid is added to a foresaid thick pulp, sufficient to obtain the quantitative dissolution of zinc without iron excessive dissolution. The disadvantage is that, besides using zinc sulfate solution to dissolve it inserting zinc in the process, the reaction is not controlled stoichiometrically.

The processes currently used for recovery of zinc of waste of steelworks powder present several disadvantages, inconveniences and limitations, such as low selectivity to zinc, with co-dissolution of iron, high temperature dissolution, use of many reagents for recovery, which increase the cost of the process and the amount of effluents, the use of electrolysis to assist in dissolution, which increases the energetic demand of the process.

SUMMARY

A process can provide for zinc recovery from steelworks powder, and to obtain valuable product-containing zinc sulfate, for use as a fertilizer. Such a process aims to add value to steelmaking waste, by partially converting environmental liability in a commercial product by taking advantage of the steelworks' powder as a raw material for the production of a liquid fertilizer, which can be ready for use, containing zinc and sulfur with low liquid effluent in its production. In application of the fertilizer feedstock, zinc has a micronutrient function and acts as an enzyme activator for maturation and growth of plants; and the sulfur is a macronutrient constituent of amino acids. Such a process can provide advantages as to simplicity, use of mild temperatures, use of a single reactant, overall conversion of reactants into a product solution of commercial quality, ready for use as a foliar fertilizer with low generation of wastewater and without generation of additional waste.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
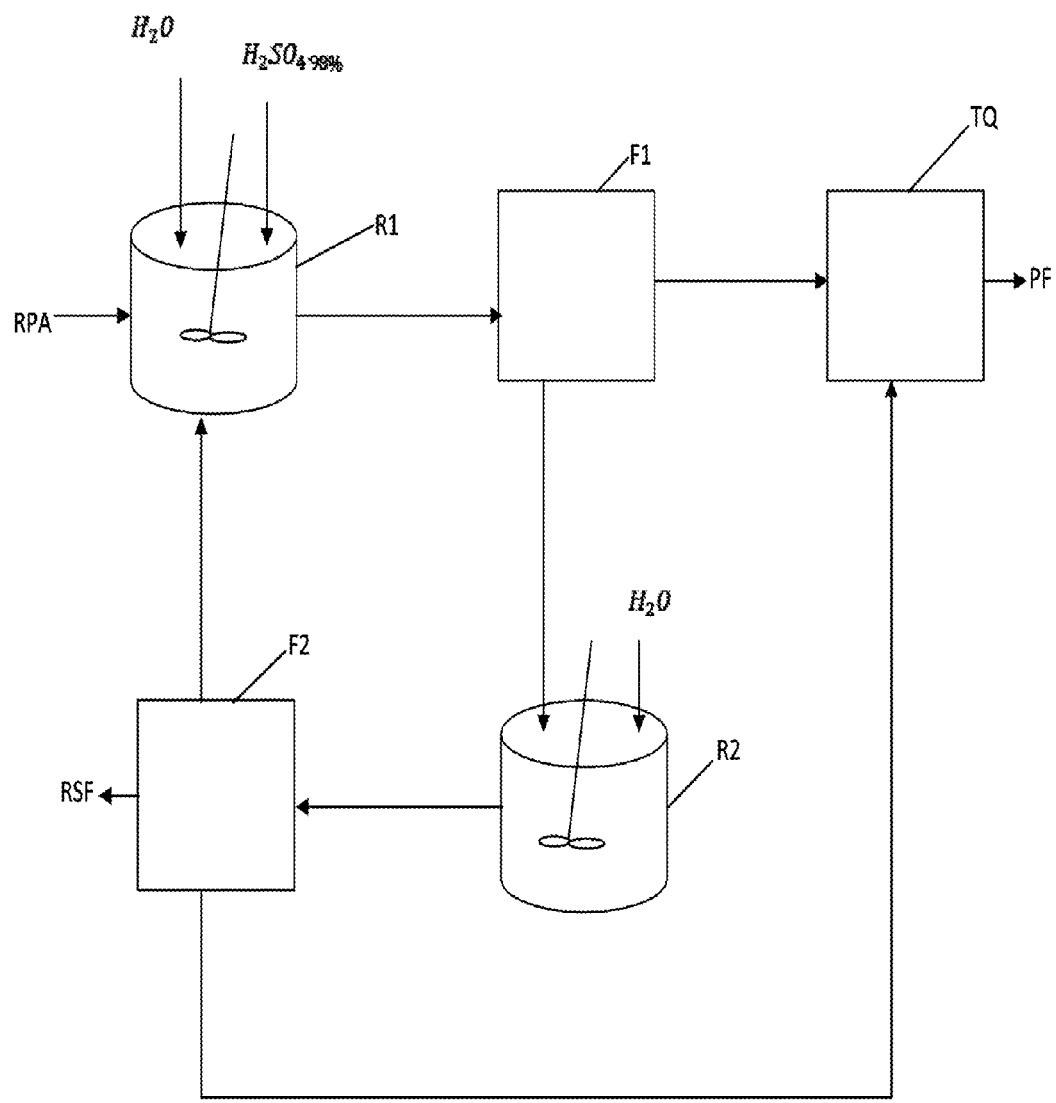
FIG. 1 illustrates an example system.

This description is not to be taken in a limiting sense, but rather is made merely for the purpose of describing the general principles of the implementations. The scope of the described implementations should be ascertained with reference to the issued claims.

A process can produce a zinc sulfate solution using powder obtained from steelworks. A process can produce a fertilizer that includes zinc. A process can overcome inconveniences, disadvantages and limitations of currently existing processes, by introducing process actions, with simplicity, using mild temperatures and a single reagent, that promote recovery of zinc from waste of steelworks powder, for example, with full conversion of the reactants into a product solution of commercial quality, ready for use as a foliar fertilizer with low generation of wastewater and without generating additional waste, not increasing the potential pollution of EAF powder (e.g., electric arc furnace powder or dust) used as raw material.

The following describes the history of the research and development process:

Based on the works of Pedrosa et al. and Alane et al., a zinc steelworks powder recovery process aimed to produce fertilizer grade zinc sulfate.

For this, they worked in a process where the dust was first digested by an $H_2SO_4$ 0.35 M solution for 4 hours in a ratio of 20:1 (solution: powder). This step was tested also with a 0.5 M solution and it was found that the increase of iron dissolution, contaminant in the process, did not justify the zinc dissolution gain. It also changed the digestion time, evaluating the dissolution of zinc with time, and it was found that after 4 hours, the gain in dissolution increase was not significant.

After dissolution, the liquid mixture with the solid was vacuum filtered and the solution with dissolved zinc was partially neutralized with NaOH 0.5 M, in the ratio of approximately 0.5:1 (NaOH 0.5 M:solution) for iron removal. The pH was varied and it was found that the best final value is 6.5, since that lower than this, the remaining iron is still high and higher than this value, much zinc is lost in precipitate. The speed was assessed and it was found that it could not be fast since it dragged precipitated zinc due to pH localized increase. The same was observed at higher concentrations of NaOH solution.

After iron precipitation, it was reached a solution with approximately 0.5% Zn in weight. To achieve the fertilizer grade, the solution was then evaporated.

After economic evaluation of this process, it was found that the cost involved in the evaporation was very high, not making the design viable.

Thus it was concluded that it was necessary to reduce the amount of water in the process and it was modified by performing the digestion as following:

Reagents were stoichiometrically calculated, and the tests were made in a reactor, the acid dissolution occurred in batch with addition of concentrated sulfuric acid (98%) dissolved in the proportion of 15% by volume in water stirring for 1.5 hours (90 minutes). For this purpose, a ratio of 15 liters of concentrated acid per 100 kg of the residue in 100 liters of water was used.

Firstly, in the dissolution tank, it was added the acid solution to the already proposed concentration and then the residue under stirring. It was observed that the maximum temperature should be 65° C. (above this value it was observed greater dissolution of iron and lead). It was observed that times over 90 minutes do not significantly increase zinc dissolution, thus it must be kept under stirring for 90 minutes from addition of the residue.

After iron precipitation, it was reached a solution with approximately 12% Zn by weight with the expected degree for fertilizer. In such an example, adjustments can be made by evaporation or addition of zinc sulfate.

The filtered residue was washed with a volume of water corresponding to the required new batch. I.e., to process 100 kg of waste, it was used a volume of 100 liters of water to wash the residue of the terminated process. After further filtration, the filtrate is used in the new batch dissolution process. Thus, ⅔ of zinc previously dissolved in the water retained in the residue is reused in the next process of the new waste dissolution, or dilution of the final product.

Due to good results, optimization was performed as to optimal process parameters with temperature ranges, time and pH.

For a better understanding, FIG. 1 may be referenced, which shows an example of an operational flowchart of a process.

As an example, a process for obtaining zinc sulfate solution can be performed in the following sequence:

1. The content of zinc elements, iron and contaminants in waste steelworks powder (RPA) to be processed are analyzed;

2. The stoichiometric amount of sulfuric acid required to dissolve the zinc present in the residue is calculated;

3. Solution of sulfuric acid is prepared based on the stoichiometry mentioned in item 2 for the amount of residue with water in an amount calculated according to the amount of residue, to obtain a zinc sulfate solution with Zn content above 12% in weight for grade fertilizer;

4. In a reactor (R1) is added to the sulfuric acid solution and then the residue of steelworks' powder (RPA) under stirring;

5. The mixture is kept under stirring at the minimum time to obtain the desired final solution yields above 12% Zn by weight, controlling the temperature at maximum 65° C., and keeping pH below sulfate precipitation zinc point.

6. Filter the mixture on the filter (F1), forwarding the filtrate, which is a zinc sulfate solution with the highest concentration of 12% to a tank (TQ) of final product storage (PF) analyzing the concentration of Zn;

7. Forward to poor wet solid residue remaining zinc filtration to a second reactor (R2), previously added with water in the proportion used above;

8. Stir for 8 to 12 minutes;

9. The mixture on the filter is filtrated (F2), the filtrate to be mixed with the final product in the tank (TQ) is forwarded, provided there is no dilution below 12% Zn in weight, or sulfuric acid new solution preparation in step 3; and 10. Final solid residue (RSF) for secondary treatment or disposal according to the local norm of the halfway environmental legislation is forwarded.

The specification of the product obtained was as follows: Zinc sulfate solution with concentration above 12% in weight and grade fertilizer, including as regards the contaminants: iron, lead and others.

A process can include:

1. analyze the content of the elements zinc, iron and contaminants in waste EAF dust (RPA) to be processed;

2. Calculate the stoichiometric amount of sulfuric acid required to dissolve the zinc present in the residue;

3. Prepare solution of sulfuric acid, based on the stoichiometry mentioned in item 2 for the amount of residue with water in an amount calculated on the basis of the amount of residue to obtain a zinc sulfate solution over 12 Zn content % to be grade fertilizer;

4. In a reactor (R1), is added to the sulfuric acid solution and then the residue of EAF dust (RPA) under stirring;

5. Maintain the mixture under stirring at the minimum time to obtain the desired final solution yields above 12% Zn, controlling the temperature at maximum 65° C. and the pH maintained below sulfate precipitation point zinc.

6. Filter the mixture on the filter (F1), forwarding the filtrate, which is a zinc sulfate solution with the highest concentration of 12% to a tank (TQ) 25 to final product storage (PF) analyzing the concentration of Zn;

7. Forward to poor wet solid residue remaining zinc filtration to a second reactor (R2), previously added with water in the proportion used above;

8. Stir for 8 to 12 minutes;

9. Filter the mixture on the filter (F2) forwards the filtrate to be mixed with the final product in the tank (TQ) 05 provided there is no dilution below 12% Zn, or new solution preparation sulfuric acid in step 3; and 10. Forward end the solid residue (RSF) for secondary treatment or disposal according to the local norm of the halfway environmental legislation.

Such a process can include not generating liquid effluent. The foregoing process can be characterized in that it does not generate additional waste, not increasing the pollution potential of EAF dust used as starting material.

A process can produce a zinc sulfate solution, with a concentration above 12% and grade fertilizer, including in relation to contaminants iron, lead, and others.

What is claimed is:

1. A method for production of a solution of zinc sulfate from powder obtained from a steel mill, the method comprising:
   a. analyzing the content of the elements zinc, iron and contaminants in powder to be processed;
   b. calculating the stoichiometric amount of sulfuric acid required to dissolve the zinc present in the powder;
   c. preparing a solution of sulfuric acid, based on the stoichiometry for the amount of powder with water in an amount calculated on the basis of the amount of powder to obtain a zinc sulfate solution over 12 percent Zn content by weight for fertilizer grade;
   d. in a reactor, adding to the sulfuric acid solution, the powder under stirring to form a mixture;
   e. maintaining the mixture under stirring at a minimum time to obtain a desired final solution yield above 12 percent by Zn content by weight, while controlling temperature at a maximum of 65 degrees C. and while maintaining the pH below a precipitation point of zinc sulfate;
   f. filtering the mixture on a filter, forwarding filtrate, which is a zinc sulfate solution with the highest concentration of 12 percent Zn by weight, to a tank for storage of the final product and analyzing the concentration of Zn;
   g. forwarding poor wet solid residue remaining of zinc filtration to a second reactor, previously added with water in the proportion used above, to form a secondary mixture;
   h. stirring for 8 to 12 minutes;
   i. filtering the secondary mixture on a filter, forwarding the filtrate to be mixed with contents in a final product tank, provided there is no dilution below 12 percent Zn by weight; and
   j. forwarding remaining solid residue for secondary treatment or disposal according to environmental legislation.

2. The method of claim 1 characterized in that liquid effluent is not generated.

3. The method of claim 1 characterized in that it does not generate additional waste and does not increase pollution potential of steel mill powder used as the starting material.

4. The method of claim 1, a product produced characterized in being a zinc sulfate solution, with a concentration above 12 percent Zn by weight and of a fertilizer, including consideration in relation to contaminants.

5. The method of claim 4 wherein the contaminants considered comprise at least one of iron and lead.

* * * * *